United States Patent Office 2,884,461
Patented Apr. 28, 1959

2,884,461
BIS(TRICYCLOHEXYLPHOSPHONIUM HALIDES)

Clinton A. Dornfeld, Glenview, Ill., assignor to G. D. Searle & Co., Chicago, Ill., a corporation of Illinois No Drawing. Application September 9, 1955
Serial No. 533,528

8 Claims. (Cl. 260—606.5)

This invention relates to bis(tricyclohexylphosphonium halides), and to processes for the manufacture thereof. More particularly, this invention relates to bis(tricyclohexylphosphonium halides) wherein the 2 phosphorus atoms are separated by an alkylene radical optional incorporating a benzene ring. The subject compounds may be represented by the structural formula

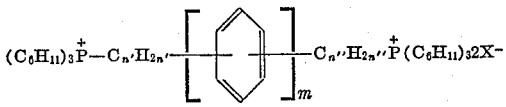

wherein X is halogen, $m$ is 0 or the positive integer 1, and $n'$ and $n''$ are so selected from the positive integers 1 through 6 that (a) when $m$ is 0, $n'$ and $n''$ add to more than 4 and less than 11, and (b) when $m$ is 1, $n'$ and $n''$ are each 1 also. It follows from this that when $m$ in the foregoing formula is 0, the compounds specified are bis(tricyclohexylphosphonium halides) of the formula $$(C_6H_{11})_3\overset{+}{P}-Y-\overset{+}{P}(C_6H_{11})_32X^-$$

wherein X is defined as above and Y is an alkylene radical containing at least 5 and not more than 10 carbon atoms. The alkylene radicals thus comprehended may be either straight- or branched-chain structures, and include, for example, 1,4-pentylene

3,4-dimethyl-1,2-pentylene

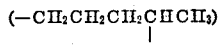

Pentamethylene (—CH$_2$CH$_2$CH$_2$CH$_2$CH$_2$—)

2,5-hexylene

3-ethyl-1,5-hexylene

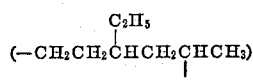

Hexamethylene (—CH$_2$CH$_2$CH$_2$CH$_2$CH$_2$CH$_2$—)

Heptamethylene (—CH$_2$CH$_2$CH$_2$CH$_2$CH$_2$CH$_2$CH$_2$—)

2-ethyl-7-methyl-3,6-octylene

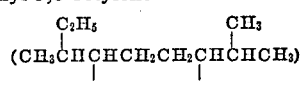

Octamethylene (—CH$_2$CH$_2$CH$_2$CH$_2$CH$_2$CH$_2$CH$_2$CH$_2$—)

7-ethyl-1,2-nonylene

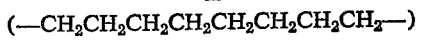

6-methyl-3,8-nonylene

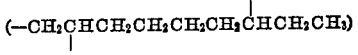

Nonamethylene (—CH$_2$CH$_2$CH$_2$CH$_2$CH$_2$CH$_2$CH$_2$CH$_2$CH$_2$—)

and

Decamethylene (—CH$_2$CH$_2$CH$_2$CH$_2$CH$_2$CH$_2$CH$_2$CH$_2$CH$_2$CH$_2$—)

radicals.

The compounds of this invention possess valuable pharmacological properties. For example, the subject compounds are anticholinergic agents, useful in blocking the transmission of nerve impulses across the autonomic ganglia. Moreover, the claimed compositions are distinguished among phosphonium compounds generally by their comparative freedom from hypotensive side effects.

The compounds to which this invention relates are soluble in water, as also in aqueous solutions of alcohols and other water-miscible organic solvents. They may be administered in solid form as tablets or capsules; dissolved in aqueous media, they may be given parenterally.

The subject compounds may be conveniently prepared in accordance with the following procedure: Tricyclohexylphosphine is reacted with an appropriate alkylene or xylylene halide—preferably a bromide, such as 1,5-dibromopentane or an iodide, such as α,α'-diiodo-m-xylene—using chloroform, 2-butanone, 2,4-pentanedione, or other inert, polar, organic solvent as the reaction medium. The reactants are ordinarily maintained at temperatures between approximately 90° and 150° centigrade for periods of time ranging from as little as 15 minutes to as much as 72 hours, in order to complete the reaction. One efficacious combination of temperature and time is 130–140° centigrade for 2 hours. With lower temperatures, much longer reaction times may be preferred. A sealed vessel is used to contain the reagents when the selected operating temperatures require working under pressure. The phosphonium bromides and iodides of this invention so derived are converted to the claimed chlorides by heating with silver chloride—for example, in aqueous medium at reflux temperatures over a two-hour period.

Tricyclohexylphosphine may be prepared by interaction of chlorocyclohexane and lithium to give the corresponding organo-metallic compound, which then is reacted with phosphorus trichloride to produce the desired phosphine.

The following examples describe in detail certain of the compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

Example 1

*Tricyclohexylphosphine.*—The following operations, up to and including distillation of product, are carried out in an atmosphere of nitrogen: To 138 parts of finely divided lithium suspended in 3150 parts of normal pentane at reflux temperatures is added, with agitation, 950 parts of chlorocyclohexane over approximately 4 hours. The reaction which ensues is mildly exothermic, only occasional external heat being required to maintain operating temperatures. Addition of chlorocyclohexane having been completed, reflux is continued by heating with agitation for 20 hours, whereupon 137 parts of phosphorus trichloride in 3150 parts of normal pentane is introduced during a 2 hour period, reflux being spontaneous throughout the latter operation. The reactants are heated at reflux temperatures, with agitation, for an additional 24 hours, at which point excess lithium and cyclohexyllithium is destroyed by thorough mixing with 100 parts of alcohol and, subsequently, 2000 parts of water. The non-aqueous phase is then separated, dried over anhydrous sodium sulfate, filtered, stripped of solvent by evaporation, and finally distilled in vacuo. The pale yellow oil which comes over at 150–200° C./0.3 mm. is tricyclohexylphosphine.

*Example 2* p - Xylene - α,α' - bis(tricyclohexylphosphonium bromide).—A mixture of 145 parts of tricyclohexylphosphine, 68 parts of α,α'-dibromo-p-xylene, and 490 parts of 2,4-pentanedione is heated at reflux temperatures for 2 hours under an atmosphere of nitrogen. Addition of anhydrous ether to the cooled reaction mixture precipitates a dark-colored oil which, washed with additional quantities of anhydrous ether, solidifies. Extraction of the solid by trituration with acetone gives a near-white powder which melts well above 300° C. The product thus obtained is p-xylene-α,α'-(tricyclohexylphosphonium bromide) having the formula

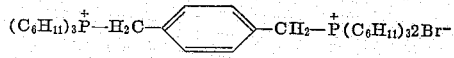

Samples of material prepared by the foregoing procedure were found to analyze 19.30% bromine and 7.14% phosphorus.

*Example 3* m-Xylene-α,α'-bis(tricyclohexylphosphonium iodide).— A mixture of 280 parts of tricyclohexylphosphine and 179 parts of α,α'-diiodo-p-xylene is heated for 3½ hours in 975 parts of 2,4-pentanedione at its boiling point, a nitrogen atmosphere being maintained throughout. The reactants are cooled to room temperature and then mixed with several volumes of anhydrous ether. The precipitate which forms in m-xylene-α,α'-bis(tricyclohexylphosphonium iodide), of the formula

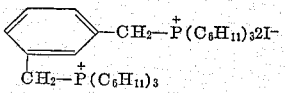

*Example 4* o-Xylene-α,α'-bis(tricyclohexylphosphonium bromide). —To 47 parts of α,α'-dibromo-o-xylene in 245 parts of 2,4-pentanedione is added 130 parts of tricyclohexylphosphine. The reactants are heated at reflux temperatures in an atmosphere of nitrogen for 2 hours, following which the dark reaction mixture is poured into anhydrous ether and intimately mixed therewith by trituration. The sandy powder which results is extracted with water, and the aqueous extract is then vacuum-distilled to dryness at 90° C. The residue is dissolved in acetone, treated with decolorizing charcoal, and filtered. Stripping of solvent at 90° C. under nitrogen, and auxiliary drying in vacuo, affords o-xylene-α,α'-bis(tricyclohexylphosphonium bromide) as a "frothy"-appearing solid. The product is extremely hygroscopic. It has the formula

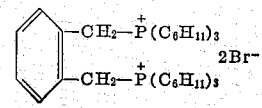

Samples of material prepared by the foregoing procedure analyzed 19.98% bromine and 7.51% phosphorous.

*Example 5* o-Xylene-α,α'-bis(tricyclohexylphosphonium chloride). —A solution of 40 parts of the bisbromo compound of the preceding Example 4 in 4000 parts of water is mixed with 14 parts of silver chloride and refluxed for 2 hours. The o-xylene-α,α'-bis(tricyclohexylphosphonium chloride) thus produce has the formula

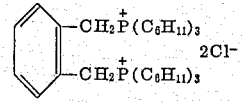

*Example 6*

Pentamethylenebis(tricyclohexylphosphonium bromide). —A solution of 90 parts of tricyclohexylphosphine and 37 parts of 1,5-dibromopentane in 745 parts of dry chloroform is allowed to react at 100° C. in a sealed vessel under a nitrogen atmosphere for 48 hours. The reactants are cooled to room temperatures and then mixed with several volumes of anhydrous ether, thereby precipitating an oil. The oil is extracted with water and the aqueous extract washed several times with ether. The extract is then treated with decolorizing charcoal and filtered. Vacuum distillation of the filtrate at approximately 90° C. affords a colorless oily residue which is further purified by chromatographing on silica gel, using alcohol and chloroform as developing solvents. There results a white, powdery, extremely hygroscopic product which is pentamethylenebis(tricyclohexylphosphonium bromide), having the formula

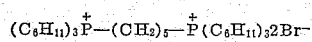

Analysis of material prepared by the foregoing procedure was found to have a bromine content of 20.15% and a phosphorus content of 7.24%.

*Example 7*

Decamethylenebis(tricyclohexylphosphonium bromide). —A solution of 93 parts of tricyclohexylphosphine and 50 parts of 1,10-dibromodecane in 490 parts of 2,4-pentanedione is heated at reflux temperatures under a nitrogen atmosphere for 2 hours. Addition of ether to the cooled reaction mixture precipitates an oil, which is taken up in water. The aqueous extract is washed several times with ether, following which water is removed by vacuum distillation at approximately 90° C. The residual oil is dissolved in acetone, and the acetone extract is then treated with decolorizing charcoal and filtered. The filtrate is stripped of solvent at 90° C. and finally chromatographed on silica gel, using alcohol and chloroform as developing solvents. There is obtained by this procedure pure decamethylenebis(tricyclohexylphosphonium bromide), of the formula

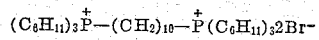

Analysis of material prepared by the foregoing procedure confirmed the assigned identity.

What is claimed is:

1. A compound of the formula

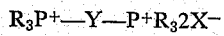

wherein R is a cyclohexyl radical; X is halogen selected from the group consisting of chlorine, bromine, and iodine; and Y is selected from the group consisting of radicals of the formula

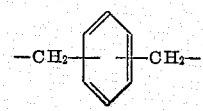

and

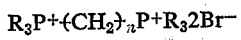

$n$ being a positive integer greater than 4 and less than 11.

2. A compound of the formula $$R_3P^+\text{-}(CH_2)_nP^+R_32Br^-$$

wherein R is a cyclohexyl radical and $n$ is a positive integer greater than 4 and less than 11.

3. Pentamethylenebis(tricyclohexylphosphonium bromide).

4. Decamethylenebis(tricyclohexylphosphonium bromide).

5. A compound of the formula

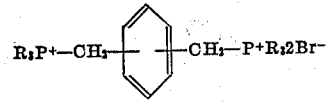

wherein R is a cyclohexyl radical.

6. o-Xylene-α,α'-bis(tricyclohexylphosphonium bromide).

7. p-Xylene-α,α'-bis(tricyclohexylphosphonium bromide).

8. In a process for producing a compound of the formula $$R_3P^+\text{—}Y\text{—}P^+R_32X^-$$

wherein R is a cyclohexyl radical; X is halogen selected from the group consisting of chlorine, bromine, and iodine; and Y is selected from the group consisting of radicals of the formula

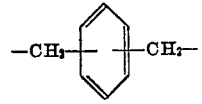

and

$n$ being a positive integer greater than 4 and less than 11, the step which comprises contacting—at temperatures in the range from 90° to 150° centigrade, under an inert atmosphere, and in the presence of an inert, polar, organic solvent—tricyclohexylphosphine with a halide of the formula $$X\text{—}Y\text{—}X$$

X being defined as halogen selected from the group consisting of bromine and iodine, and Y being defined as above.

References Cited in the file of this patent

Ginzel et al.: Chem. Abs. 47, col. 4496.
Ginzel et al.: Chem. Abs. 48, col. 8951.

UNITED STATES PATENT OFFICE
Certificate of Correction

Patent No. 2,884,461

April 28, 1959

Clinton A. Dornfeld

It is hereby certified that error appears in the printed specification of the above numbered patent requiring correction and that the said Letters Patent should read as corrected below.

Column 1, line 21, for "optional" read —optionally—; lines 25 and 26, first formula, and lines 36 and 37, second formula, for $$\overset{+}{P}(C_6H_{11})_3 2X^-  \quad \text{read} \quad \overset{+}{P}(C_6H_{11})_3 \quad 2X^-$$

column 3, lines 36 and 37, first formula, and column 4, lines 36 and 37, second formula, and lines 59 and 60, third formula, for $$-\overset{+}{P}(C_6H_{11})_3 2Br^- \quad \text{read} \quad -\overset{+}{P}(C_6H_{11})_3 \quad 2Br^-$$

same column 3, lines 51 and 52, second formula, for $$-\overset{+}{P}(C_6H_{11})_3 2I^- \quad \text{read} \quad -\overset{+}{P}(C_6H_{11})_3 \quad 2I^-$$

column 4, line 10, for "produce" read —produced—; line 37, for "Analysis of material" read —A sample of material—; same column 4, line 65, claim 1, first formula, and column 5, line 25, claim 8, in the formula, for $$-P^+R_3 2X^- \quad \text{read} \quad -P^+R_3 \quad 2X^-$$

column 5, line 5, claim 2, in the formula, and line 16, claim 5, in the formula, for $$P^+R_3 2Br^- \quad \text{read} \quad P^+R_3 \quad 2Br^-$$

Signed and sealed this 1st day of September 1959.

[SEAL]

Attest:
KARL H. AXLINE,
*Attesting Officer.*

ROBERT C. WATSON,
*Commissioner of Patents.*